Patented Mar. 8, 1938

2,110,369

UNITED STATES PATENT OFFICE

2,110,369

MANUFACTURE OF ORGANIC FLUORINE COMPOUNDS

Fred Davison Leicester, St. Helens, England, assignor to Imperial Chemical Industries Limited, a corporation of Great Britain No Drawing. Application December 21, 1936, Serial No. 117,093. In Great Britain January 3, 1936

17 Claims. (Cl. 260—166)

This invention or discovery relates to the manufacture of fluorinated compounds; and it comprises a method of making fluoro derivatives of the lower aliphatic hydrocarbons (methane, ethane, propane, etc.) wherein a chloro derivative is treated with HF in the presence of a chromium halide as a catalyst; all as more fully hereinafter set forth and as claimed.

Fluorinated derivatives of the lower hydrocarbons are now coming into extensive use because of their many valuable properties. They are technically made from chlorinated hydrocarbons using HF as the source of fluorine; the operation being virtually an exchange of one halogen for another. The character of the action is largely influenced by the catalyst used. Several have been proposed, including metallic halide catalysts having the property of exchanging a halogen with that of hydrogen fluoride; the fluoride formed having the property of exchanging halogen with acyclic hydrocarbon derivatives containing a halogen other than fluorine. There are several metallic halides known having the stated properties, but all exert a substantial chemical action upon halogenated acyclic hydrocarbons. For example, fluorine-containing derivatives of methane have been made by reacting HF with the vapors of CCl4 in the presence of antimony chlorides on a coke carrier. The antimony chlorides are excellent chlorine carriers and are often used for that purpose, because of their two stages of chlorination, but in this particular action they do not give results as good as can be desired. Catalysts other than metallic halides have also been used such as activated carbon.

As I have discovered chromium halides, including chromium fluoride, are particularly efficient catalysts in the production of fluoro derivatives using HF and a chlorinated hydrocarbon. Chromium fluoride has no substantial action upon halogenated derivatives of acyclic hydrocarbons, and it gives a smoother and more productive and uniform reaction in making fluorine derivatives than the prior catalysts which have been proposed.

I have discovered that I can manufacture fluoro derivatives of hydrocarbons by reacting hydrogen fluoride at an elevated temperature and in the presence of a chromium halide with the vapor of a saturated halogen derivative of a lower aliphatic hydrocarbon containing at least one halogen atom other than fluorine. Typical derivatives include tetrachlormethane (carbon tetrachloride), trichloromethane, monofluorotrichloromethane, tetrachloroethane, etc. Suitable chromium halides for use in the reaction are chromic chloride and chromic fluoride supported on carbon in a massive or granular form. In some cases the chromium halide may also be associated with chromic oxide. A suitable temperature at which to carry out the reaction is 350–550° C. depending on the catalyst and the derivative it is desired to prepare.

A suitable catalyst may be prepared by soaking a carbon support, e. g., charcoal or coke, in an aqueous solution of chromic chloride, advantageously acidified by addition of hydrochloric acid when the presence of oxychlorides or oxide is not desired, and then drying in vacuo, or in a stream of an inert gas at a raised temperature. The proportion of chromium salt to carbon may be varied in any convenient manner, such as for example, by altering the concentration of the impregnating solution or by subjecting the carbon to more than one impregnation with a saturated solution, and drying it after each impregnation. A chromium fluoride catalyst may be prepared by treating freshly precipitated chromic hydroxide with aqueous hydrogen fluoride, pasting the product on granulated coke, and drying the mixture in a current of inert gas, e. g., nitrogen, at temperatures of 400–600° C.

I find that the extent to which fluorination of the hydrocarbon halide takes place increases with increasing temperature, and with increasing proportion of hydrogen fluoride to hydrocarbon halide. I prefer to work with an excess of the hydrocarbon halide, since under such circumstances it is easier to control the composition of the reaction products (by varying the temperature and the magnitude of the excess) and to free them from unconverted materials in an economical and convenient manner. However, in preparing the more highly fluorinated derivatives it is sometimes not feasible to produce satisfactory yields unless a large proportion of hydrogen fluoride is use.

The reaction products may be treated to isolate the fluoro derivatives from unconverted materials and by-products, e. g., by selective absorption in suitable solvents, or by liquefaction and fractional distillation or by fractional condensation of the reaction products or by a combination of these methods. Thus, the hydrogen halide produced in the reaction, together with unreacted hydrogen fluoride, may be removed by absorption in water or aqueous alkali or both, maintained above the boiling point of the fluoro derivatives, the gases dried, and then condensed. Normally a mixture of fluoro derivatives is obtained, e. g., when carbon tetrachloride is the original halogen derivative a number of fluorochloro derivatives of methane may be formed; these various compounds can be separated from each other and from excess of the carbon tetrachloride by fractional distillation or otherwise, and the unchanged carbon tetrachloride returned to the reaction chamber, together with more hydrogen fluoride. Conveniently, this can be done by introducing the returned tetrachloride into a stream of the original reactants which are being led into the reaction chambers.

Where the object is to produce a particular fluorine derivative containing more than one fluorine atom per molecule, any fluorinated compounds which contain less than the desired number of fluorine atoms per molecule may be separated from the principal or desired product and be likewise returned to the reaction chamber.

The invention will be further described with reference to the manufacture of chlorofluoro derivatives of methane by reacting carbon tetrachloride with hydrogen fluoride, though it will be understood that my invention is not limited to the use of this particular starting material; that is, to carbon tetrachloride.

In carrying out this form of my invention, chlorofluoro derivatives of methane are prepared by passing vapors of carbon tetrachloride and hydrofluoric acid thru a reaction tube containing a chromium halide catalyst, suitably granular coke impregnated with 5 per cent of its weight of chromic chloride, or coke covered with a layer of the pasty material produced by repeatedly treating freshly precipitated chromic hydroxide with concentrated aqueous hydrofluoric acid and then drying the pasted coke in a stream of nitrogen at 400–500° C.

The reaction mixture of hydrogen fluoride and carbon tetrachloride can be obtained in a convenient manner by bubbling the hydrogen fluoride into a bulk of carbon tetrachloride maintained at a suitable temperature, and by varying this temperature the proportion of the two constituents may be varied. Thus, for example, if the temperature of the carbon tetrachloride is 70° C. the ratio (by volume) of the hydrogen fluoride to the carbon tetrachloride in the mixed vapor is 0.23:1, while if the temperature is lowered to 53° C. the ratio becomes 1.20:1.

The reaction temperature used, must, of course, be less than the melting point of chromium halide. From this point of view it may approach 600° C. if chromium fluoride is used, but temperatures above about 550° C. are not suitable when the catalyst is chromium chloride. The effect of the temperature on the hydrocarbon derivatives must also be considered. In the case of carbon tetrachloride for instance pyrolytic decomposition commences above about 550° C. with the formation of hexachlorethane. The choice of suitable temperature is also influenced by the particular derivative it is desired to prepare since the formation of those derivatives containing a lower number of fluorine atoms is favored by a lower temperature.

The reaction time necessary is dependent largely on the temperature of the catalyst and on the particular derivative which it is desired to produce, lower temperatures and the more highly fluorinated compounds requiring the longer times. In general I find that at temperatures of between 400° and 550° C. contact times of 15 to 25 seconds will furnish satisfactory yields.

Using a chromium fluoride catalyst at 350° C. and a rate of flow such that the time of contact with the catalyst is 20 seconds, I find that with a ratio of hydrogen fluoride to carbon tetrachloride of 0.23:1.0 by volume the reaction products contain a few percent of unreacted carbon tetrachloride while the remainder is a mixture of almost equal proportions of $CFCl_3$ and $CF_2Cl_2$. On increasing the ratio of HF to $CCl_4$ the amount of the $CF_2Cl_2$ increases, becoming about 70 per cent of the reaction product when the ratio is 0.6:1, and about 80 per cent when it is 1.20:1. When the proportion of HF is increased still further the amount of $CF_2Cl_2$ diminishes while notable amounts of $CF_3Cl$ appear. In order to obtain appreciable amounts of $CF_4$ it is necessary to make the value of the ratio $HF/CCl_4$ still higher.

It will be apparent therefore, that if it is desired to prepare mainly $CFCl_3$ it is desirable to use a low proportion (by volume) of hydrogen fluoride to carbon tetrachloride. A lower catalyst temperature e. g. 400° C. will also favor the proportion of $CFCl_3$. On the other hand, if the main product is to be $CF_2Cl_2$, a temperature of 550° C. and a ratio of hydrogen fluoride to carbon tetrachloride of 1.2:1 give very favorable conditions, since while a high proportion of the desired compound is obtained in the reaction product, there are practically no overfluorinated bodies, the remainder of the fluorine being present as monofluorotrichloromethane which can be returned to the reaction zone for further fluorination.

From the above it will be seen that the exit gases from the catalyst chamber contain hydrogen chloride, unreacted hydrofluoric acid gas or carbon tetrachloride or both, together with various proportions of $CFCl_3$, $CF_2Cl_2$, $CF_3Cl$ and $CF_4$. The acids may be removed by washing successively with water and caustic soda solution and the gases dried by contact with concentrated sulphuric acid, each of these reagents being maintained at about 50° C. in order that the fluoromethanes shall not be condensed. The dried exit gases may be then liquefied by cooling to about −50° C. and fractionated. Alternatively, any carbon tetrachloride present and any monofluorotrichloromethane may be removed directly (either separately or together) from the exit gases by means of one or more condensing columns working at appropriate temperatures, and the acids subsequently removed before condensing the remaining fluorinated hydrocarbons.

The following examples illustrate my invention:—

Example 1

To prepare the catalyst coke broken to pass a ¼ inch mesh and stay on a ⅕ inch mesh was impregnated with 5 per cent of its weight of chromic chloride, and dried in a current of nitrogen at 450° C. Gaseous hydrogen fluoride was bubbled through carbon tetrachloride heated to 68–70° C. to obtain a mixture of reactant vapors containing about 20 per cent by volume of hydrogen fluoride. This mixture was passed over the catalyst in a chamber at 400° C. the time of contact being 20 seconds. The exit gases were first cooled to 0° C. to condense as much as possible of the excess carbon tetrachloride together with some $CFCl_3$ and then scrubbed successively with water, dilute caustic soda solution, and concentrated sulphuric acid. The residual $CFCl_3$, $CF_2Cl_2$ and any remaining $CCl_4$ were finally condensed by cooling to −50° C.

Example 2

A chromium fluoride catalyst was prepared by treating 158 parts by weight of chromic chloride with excess aqueous ammonia. The precipitated chromium hydroxide was washed with water and the product treated with 100 parts by weight of 60 per cent aqueous hydrofluoric acid. The coke (⅛ to 1/16 inch mesh) was pasted with this chromium fluoride to give a catalyst containing 15 per cent by weight of chromium fluoride and the whole was dried out in a nickel catalyst tube in a current of nitrogen for 4–5 hours at 450° C. Over this catalyst maintained at 550° C. was passed a mixture of hydrogen fluoride and carbon tetrachloride, the proportion of the former to the latter being 0.23:1 by volume, and the time of contact with the catalyst being 20 seconds. The off-gases were washed with water and caustic soda solution, dried with sulphuric acid, each of these reagents being maintained at 50° C., and condensed at −50° C. On analysis the gases were found to have the following constitution:

| | Per cent by weight |
|---|---|
| $CFCl_2$ | 47.2 |
| $CFCl_3$ | 45.9 |
| $CCl_4$ | 6.9 |

The conversion of hydrofluoric acid to fluorinated hydrocarbons was practically 100 per cent.

*Example 3*

The process of Example 2 was repeated, using a catalyst temperature of 450° C. The condensed gases had the following composition:—

| | Per cent by weight |
|---|---|
| $CF_2Cl_2$ | 33.4 |
| $CFCl_3$ | 60.6 |
| $CCl_4$ | 6.9 |

Practically complete conversion of the hydrogen fluoride was attained.

*Example 4*

The process of Example 2 was repeated, the ratio $HF/CCl_4$ being 1.20:1. The gases had the following composition:

| | Per cent by weight |
|---|---|
| $CF_2Cl_2$ | 82.1 |
| $CFCl_3$ | 17.9 |
| $CCl_4$ | trace |

*Example 5*

A mixture of HF and $CCl_4$ vapour in the ratio of 2.0:1 was passed over a chromium fluoride catalyst prepared as in Example 2, and maintained at 550° C., the time of contact with the catalyst being 20 seconds. The gases were collected as in Example 2, and had the following composition:

| | Per cent by weight |
|---|---|
| $CF_3Cl$ | 8.1 |
| $CF_2Cl_2$ | 67.8 |
| $CFCl_3$ | 24.1 |
| $CCl_4$ | trace |

As many apparently widely different embodiments of this invention may be made without departing from the spirit and scope thereof it is to be understood that I do not limit myself to the specific embodiments thereof except as defined in the appended claims.

I claim:

1. Process for the preparation of fluoro-derivatives of hydrocarbons which comprises reacting hydrogen fluoride at an elevated temperature, at least approximately 350° C., and in the presence of a chromium halide with the vapor of a saturated halogen derivative of a lower aliphatic hydrocarbon containing at least one halogen atom other than fluorine.

2. Process as claimed in claim 1 in which the chromium halide is chromium fluoride.

3. Process for the preparation of fluoro-derivatives of methane which comprises reacting hydrofluoric acid gas at an elevated temperature, at least approximately 350° C., and in the presence of a chromium halide with the vapor of carbon tetrachloride.

4. Process for the preparation of fluoro-derivatives of methane which comprises reacting hydrofluoric acid gas at an elevated temperature, at least approximately 350° C., and in the presence of a chromium fluoride with the vapor of carbon tetrachloride.

5. Process as claimed in claim 1 in which the reaction is carried out at a temperature of 350–550° C.

6. Process as claimed in claim 1 in which the chromium halide is chromium fluoride and the reaction is carried out at a temperature of 350–550° C.

7. Process as claimed in claim 1 where the aliphatic hydrocarbon is carbon tetrachloride and the reaction is carried out at a temperature of 350–550° C.

8. Process as claimed in claim 1 in which the aliphatic hydrocarbon is carbon tetrachloride and the chromium halide is chromium fluoride and the reaction is carried out at 350–550° C.

9. Process as claimed in claim 1 in which the reaction is carried out at a temperature of 400°–550° C. the time of contact of the vapors with the catalyst being from 15 to 25 seconds.

10. Process as claimed in claim 1 in which the chromium halide is chromium fluoride and the reaction is carried out at a temperature of 400°–550° C. the time of contact of the vapors with the catalyst being from 15 to 25 seconds.

11. Process as claimed in claim 1 where the aliphatic hydrocarbon is carbon tetrachloride and the reaction is carried out at a temperature of 400°–550° C. the time of contact of the vapors with the catalyst being from 15 to 25 seconds.

12. Process as claimed in claim 1 in which the aliphatic hydrocarbon is carbon tetrachloride and the chromium halide is chromium fluoride and the reaction is carried out at 400–550° C. the time of contact of the vapors with the catalyst being from 15 to 25 seconds.

13. Process for the manufacture of dichlorodifluoromethane which comprises reacting hydrogen fluoride at an elevated temperature, at least approximately 350° C., with a gas selected from the class consisting of carbon tetrachloride and trichloromonofluoromethane in the presence of a chromium halide.

14. Process as claimed in claim 1 where the chromium halide catalyst is chromium fluoride prepared by treating freshly precipitated chromic hydroxide with aqueous hydrogen fluoride, pasting the product on granulated coke, and drying the mixture in a current of inert gas at a temperature of from 400–600° C.

15. In the exchange of the chlorine of chlorinated hydrocarbons for fluorine, the process which comprises heating the chlorinated hydrocarbon in vapor form and in admixture with HF in the presence of a chromium halide as a catalyst, at an elevated temperature sufficient to convert the chlorinated hydrocarbon at least partially to a fluorinated hydrocarbon.

16. In the process of claim 15, chromium fluoride as a catalyst.

17. In the process of claim 15, chromium chloride as a catalyst.

FRED DAVISON LEICESTER.

CERTIFICATE OF CORRECTION.

Patent No. 2,110,369. March 8, 1938.

FRED DAVISON LEICESTER.

It is hereby certified that error appears in the printed specification of the above numbered patent requiring correction as follows: Page 3, first column, line 16, for "$CFCl_2$" read $CF_2Cl_2$; and that the said Letters Patent should be read with this correction therein that the same may conform to the record of the case in the Patent Office.

Signed and sealed this 12th day of April, A. D. 1938.

(Seal)

Henry Van Arsdale,
Acting Commissioner of Patents.